(12) United States Patent
Li et al.

(10) Patent No.: US 11,626,021 B2
(45) Date of Patent: Apr. 11, 2023

(54) SYSTEMS AND METHODS FOR DISPATCHING SHARED RIDES THROUGH RIDE-HAILING PLATFORM

(71) Applicant: Beijing DiDi Infinity Technology and Development Co., Ltd., Beijing (CN)

(72) Inventors: Shuaiji Li, San Jose, CA (US); Xiaocheng Tang, Mountain View, CA (US); Zhiwei Qin, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 366 days.

(21) Appl. No.: 17/064,902

(22) Filed: Oct. 7, 2020

(65) Prior Publication Data

US 2022/0108615 A1 Apr. 7, 2022

(51) Int. Cl.
| | | |
|---|---|---|
| G06Q 10/04 | (2012.01) | |
| G08G 1/00 | (2006.01) | |
| G06N 3/04 | (2023.01) | |
| G06N 3/049 | (2023.01) | |
| G06Q 50/30 | (2012.01) | |

(52) U.S. Cl.
CPC ............. *G08G 1/202* (2013.01); *G06N 3/049* (2013.01); *G06N 3/0454* (2013.01); *G06Q 10/04* (2013.01); *G08G 1/205* (2013.01); *G06Q 50/30* (2013.01)

(58) Field of Classification Search
CPC ...... G08G 1/202; G08G 1/205; G06N 3/0454; G06N 3/049; G06Q 10/04; G06Q 50/30
See application file for complete search history.

(56) References Cited

U.S. PATENT DOCUMENTS

2016/0138928 A1 5/2016 Guo et al.
2020/0250486 A1 8/2020 Kim et al.

FOREIGN PATENT DOCUMENTS

| CN | 103680124 A | 3/2014 |
|---|---|---|
| CN | 107945503 A | 4/2018 |

(Continued)

OTHER PUBLICATIONS

Xiaocheng Tang et al., "A deep value-network Based Approach for Multi-Driver Order Dispatching", in Proceedings of the 25th ACM SIGKDD International Conference on Knowledge Discovery & Data Mining, KDD '19, pp. 1780-1790, New York, NY, USA, Aug. 4-8, 2019. Association for Computing Machinery.

(Continued)

*Primary Examiner* — Mathew Franklin Gordon
(74) *Attorney, Agent, or Firm* — Sheppard Mullin Richter & Hampton LLP

(57) ABSTRACT

A method includes: obtaining a plurality of first signals corresponding to a vehicle and a plurality of second signals corresponding to a plurality of candidate carpool combinations each comprising one or more unassigned transportation orders, wherein: the plurality of first signals comprise a current time, a location of the vehicle at the current time, and one or more static features corresponding to the vehicle, the plurality of second signals comprise timestamps, origins, and destinations of the unassigned transportation orders, and the vehicle has an on-going transportation order at the current time; inputting the plurality of first and second signals to a trained machine learning model; and obtaining, from an output of the trained machine learning model, a utility score of each of the plurality of candidate carpool combinations.

20 Claims, 7 Drawing Sheets

(56) References Cited

FOREIGN PATENT DOCUMENTS

| CN | 111260172 A | 6/2020 |
|---|---|---|
| CN | 111507501 A | 8/2020 |

OTHER PUBLICATIONS

Z. Wang et al., "Deep Reinforcement Learning with Knowledge Transfer for Online Rides Order Dispatching", in IEEE International Conference on Data Mining. IEEE, 2018.
Zhe Xu et al., "Large-Scale Order Dispatch in On-Demand Ride-Hailing Platforms: A Learning and Planning Approach", in Proceedings of the 24th ACM SIGKDD International Conference on Knowledge Discovery & Data Mining, pp. 905-913. ACM, Aug. 19-23, 2018.
PCT International Search Report and the Written Opinion dated Jan. 6, 2022, issued in related International Application No. PCT/CN2021/121259 (9 pages).

410 ↘

412: obtaining, at one or more computing devices, a plurality of first signals corresponding to a vehicle and a plurality of second signals corresponding to a plurality of candidate carpool combinations each comprising one or more unassigned transportation orders, wherein: the plurality of first signals comprise a current time, a location of the vehicle at the current time, and one or more static features corresponding to the vehicle, the plurality of second signals comprise timestamps, origins, and destinations of the unassigned transportation orders, and the vehicle has an on-going transportation order at the current time

414: inputting, at the one or more computing devices, the plurality of first and second signals to a trained machine learning model

416: obtaining, at the one or more computing devices from an output of the trained machine learning model, a utility score of each of the plurality of candidate carpool combinations

418: according to the utility score of each of the plurality of candidate carpool combinations, matching, at the one or more computing devices, one of the plurality of candidate carpool combinations with the vehicle for pooling the on-going transportation order and the one candidate carpool combination

420: transmitting, at the one or more computing devices, a dispatch signal to a computing device corresponding to the vehicle based on the match for the vehicle to pool passengers corresponding to the on-going transportation order and the one candidate carpool combination

FIG. 4

SYSTEMS AND METHODS FOR DISPATCHING SHARED RIDES THROUGH RIDE-HAILING PLATFORM

TECHNICAL FIELD

The disclosure relates generally to dispatching shared rides through a ride-hailing platform.

BACKGROUND

Online ride-hailing platforms are rapidly becoming essential components of the modern transit infrastructure. In transportation systems, how to reduce the inefficiencies due to the limited supply of ride-hailing vehicles (and drivers) and the asymmetric demand from passengers across time and space has long been a difficult issue that has a great impact on society and everyday life. The advent of online ride-hailing systems, with direct access to a large amount of real-time transit information, provide promises to greatly reduce such inefficiencies through technical solutions.

Reinforcement learning within order dispatch has been used to balance supply and demand (or referred to as rebalancing) on ride-hailing platforms. For ride-hailing systems, it is noted that they are affected by the spatial-temporal effect of order dispatch, e.g., whenever a customer engages a vehicle, it not only decreases the instantaneous availability at the source location, but also affects the future availability at all other locations in the system. Existing technologies applying reinforcement learning to rebalancing mainly focus on settings where drivers are only allowed to pick up the next orders after they complete the current trip. Relaxing this constraint would allow multiple orders to share a single ride, effectively doubling or tripling the supply capacity. This could be beneficial especially in a supply-constrained market such that it not only maximizes the utilization of the supply capacity but also optimizes the user experiences by reducing the wait time and the cancellation rate. However, deciding which orders should be 'pooled' together in a single ride is combinatorial by nature. Exact solutions are usually intractable in a large scale online system where decisions involving thousands of driver-order pairs have to be made within several hundreds of milliseconds. Moreover, the aforementioned spatial-temporal effect of pooling actions also needs to be taken into account in the decision process in order to achieve the desirable outcome across the temporal horizon.

SUMMARY

Various embodiments of the specification include, but are not limited to, cloud-based systems, methods, and non-transitory computer-readable media for dispatching shared rides through ride-hailing platform.

In some embodiments, a computer-implemented method comprises: obtaining, at one or more computing devices, a plurality of first signals corresponding to a vehicle and a plurality of second signals corresponding to a plurality of candidate carpool combinations each comprising one or more unassigned transportation orders, wherein: the plurality of first signals comprise a current time, a location of the vehicle at the current time, and one or more static features corresponding to the vehicle, the plurality of second signals comprise timestamps, origins, and destinations of the unassigned transportation orders, and the vehicle has an on-going transportation order at the current time; inputting, at the one or more computing devices, the plurality of first and second signals to a trained machine learning model; obtaining, at the one or more computing devices from an output of the trained machine learning model, a utility score of each of the plurality of candidate carpool combinations; according to the utility score of each of the plurality of candidate carpool combinations, matching, at the one or more computing devices, one of the plurality of candidate carpool combinations with the vehicle for pooling the on-going transportation order and the one candidate carpool combination; and transmitting, at the one or more computing devices, a dispatch signal to a computing device corresponding to the vehicle based on the match for the vehicle to pool passengers corresponding to the on-going transportation order and the one candidate carpool combination.

In some embodiments, the one or more static features corresponding to the vehicle comprise one or more of: date, weather, traffic condition, traffic restriction, driver record, and driver bio information.

In some embodiments, obtaining the plurality of second signals corresponding to the plurality of candidate carpool combinations each comprising one or more unassigned transportation orders comprises: selecting, at the one or more computing devices, the plurality of candidate carpool combinations based on the location of the vehicle at the current time, an origin and a destination of the on-going transportation order, the origins and the destinations of the unassigned transportation orders, and one or more settings.

In some embodiments, the method further comprises training, at the one or more computing devices, a machine learning model to obtain the trained machine learning model, wherein the machine learning model comprises a reinforcement learning agent configured to: receive, from historical data, a plurality of vectors, a plurality of rewards, and an option representation, wherein the plurality of vectors comprise, for each vehicle in the historical data, a timestamp, a location, and one or more static features, and the option representation comprises a time sequence and a location sequence of all transportation orders in the historical data corresponding to respective vehicles in the historical data; feed the plurality of vectors through a first neural network to approximate a first loss function; and feed the plurality of vectors and the option representation through a second neural network to approximate a second loss function.

In some embodiments, the machine learning model is configured to model vehicle trajectories according to a Semi-Markov Decision Process with a set of interruption options; the set of interruption options comprise performing an idle movement or assigning a transportation trip; and at each time step, the Semi-Markov Decision Process is configured to transition from a current state to a next state by executing one of the set of interruption options and configured to receive a reward corresponding to the transition.

In some embodiments, for each time step, the reward is proportional to a total value paid by all passengers within the time step in the historical data.

In some embodiments, the reinforcement learning agent is further configured to: apply cerebellar embedding to each of the locations in the historical data and the one or more static features in the historical data to output a processed location and one or more processed static features; concatenate the timestamp in the historical data, the processed location, and the one or more processed static features to output a first concatenation; feed the first concatenation to a first multilayer perceptron; and feed an output of the first multilayer perceptron to a second multilayer perceptron; and training the machine learning model comprises optimizing one or more parameters of the first neural network by minimizing the first loss function based on the reward and an output of the second multilayer perceptron.

In some embodiments, the reinforcement learning agent is further configured to: apply cerebellar embedding to the location sequence to output a processed location sequence; concatenate the time sequence and the processed location sequence to output a second concatenation; embed the second concatenation to output an embedded sequence; feed the embedded sequence to a bidirectional long short-term memory (LSTM) network of the second neural network to output an LSTM output; feed the LSTM output and the first multilayer perceptron to an attention module of the second neural network to output a sequence context vector; concatenate the first multilayer perceptron and the sequence context vector to obtain a third concatenation; and feed the third concatenation to a third multilayer perceptron; and training the machine learning model comprises optimizing one or more parameters of the second neural network by minimizing the second loss function based on the reward and an output of the third multilayer perceptron.

In some embodiments, every two adjacent vectors fed to the bidirectional LSTM network correspond to a transportation order; and the bidirectional LSTM network is configured to, for all timestamps in the historical data, average hidden outputs of forward and backward LSTM cells corresponding to the timestamp to obtain a plurality of averages and configured to concatenate the averages.

In some embodiments, the attention module is configured to: obtain a dot product of the concatenated average and the first multilayer perceptron; apply a softmax function to the dot product; and apply a multiplication operation to an output of the softmax function to output the sequence context vector.

In some embodiments, training the machine learning model comprises maximizing a utility function comprising a cumulative sum of a plurality of products each between a utility score and a binary decision variable over an episode; the utility score encodes a long-term value to a ride-hailing platform of matching a vehicle-order pair in a carpool; and the utility function is subject to a set of constraints comprising that each transportation order is assigned to at most one vehicle.

In some embodiments, training the machine learning model comprises training the first neural network and the second neural network at different frequencies; and the utility score comprises (1) an output of the trained second neural network, or (2) a difference between the output of the trained second neural network and an output of the trained first neural network.

In some embodiments, maximizing the utility function comprises solving the utility function by executing a Hungarian algorithm.

In some embodiments, the utility score captures (1) an immediate effect to the ride-hailing platform of a pool trip corresponding to the on-going transportation order and the one candidate carpool combination, and (2) an aftereffect of available vehicle supply at a final destination of the pooled trip when the vehicle finished the pooled trip.

In some embodiments, one or more non-transitory computer-readable storage media stores instructions executable by one or more processors, wherein execution of the instructions causes the one or more processors to perform operations comprising: obtaining a plurality of first signals corresponding to a vehicle and a plurality of second signals corresponding to a plurality of candidate carpool combinations each comprising one or more unassigned transportation orders, wherein: the plurality of first signals comprise a current time, a location of the vehicle at the current time, and one or more static features corresponding to the vehicle, the plurality of second signals comprise timestamps, origins, and destinations of the unassigned transportation orders, and the vehicle has an on-going transportation order at the current time; inputting the plurality of first and second signals to a trained machine learning model; obtaining, from an output of the trained machine learning model, a utility score of each of the plurality of candidate carpool combinations; according to the utility score of each of the plurality of candidate carpool combinations, matching one of the plurality of candidate carpool combinations with the vehicle for pooling the on-going transportation order and the one candidate carpool combination; and transmitting a dispatch signal to a computing device corresponding to the vehicle based on the match for the vehicle to pool passengers corresponding to the on-going transportation order and the one candidate carpool combination.

In some embodiments, a system comprises one or more processors and one or more non-transitory computer-readable memories coupled to the one or more processors and configured with instructions executable by the one or more processors to cause the system to perform operations comprising: obtaining a plurality of first signals corresponding to a vehicle and a plurality of second signals corresponding to a plurality of candidate carpool combinations each comprising one or more unassigned transportation orders, wherein: the plurality of first signals comprise a current time, a location of the vehicle at the current time, and one or more static features corresponding to the vehicle, the plurality of second signals comprise timestamps, origins, and destinations of the unassigned transportation orders, and the vehicle has an on-going transportation order at the current time; inputting the plurality of first and second signals to a trained machine learning model; obtaining, from an output of the trained machine learning model, a utility score of each of the plurality of candidate carpool combinations; according to the utility score of each of the plurality of candidate carpool combinations, matching one of the plurality of candidate carpool combinations with the vehicle for pooling the on-going transportation order and the one candidate carpool combination; and transmitting a dispatch signal to a computing device corresponding to the vehicle based on the match for the vehicle to pool passengers corresponding to the on-going transportation order and the one candidate carpool combination.

In some embodiments, a computer system includes a first obtaining module configured to obtain a plurality of first signals corresponding to a vehicle and a plurality of second signals corresponding to a plurality of candidate carpool combinations each comprising one or more unassigned transportation orders, wherein: the plurality of first signals comprise a current time, a location of the vehicle at the current time, and one or more static features corresponding to the vehicle, the plurality of second signals comprise timestamps, origins, and destinations of the unassigned transportation orders, and the vehicle has an on-going transportation order at the current time; an inputting module configured to input the plurality of first and second signals to a trained machine learning model; a second obtaining module configured to obtain, from an output of the trained machine learning model, a utility score of each of the plurality of candidate carpool combinations; a matching module configured to, according to the utility score of each of the plurality of candidate carpool combinations, match one of the plurality of candidate carpool combinations with the vehicle for pooling the on-going transportation order and the one candidate carpool combination; and a transmitting module configured to transmit a dispatch signal to a computing device corresponding to the vehicle based on the match for the vehicle to pool passengers corresponding to the on-going transportation order and the one candidate carpool combination.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the specification. It is to be understood that the foregoing general description and the following detailed description are exemplary and explanatory only, and are not restrictive of the specification, as claimed.

BRIEF DESCRIPTION OF THE DRAWINGS

Non-limiting embodiments of the specification may be more readily understood by referring to the accompanying drawings in which:

FIG. 4 illustrates an exemplary method for dispatching shared rides, in accordance with various embodiments.

DETAILED DESCRIPTION

Non-limiting embodiments of the present specification will now be described with reference to the drawings. Particular features and aspects of any embodiment disclosed herein may be used and/or combined with particular features and aspects of any other embodiment disclosed herein. Such embodiments are by way of example and are merely illustrative of a small number of embodiments within the scope of the present specification. Various changes and modifications obvious to one skilled in the art to which the present specification pertains are deemed to be within the spirit, scope, and contemplation of the present specification as further defined in the appended claims.

To at least address the issues discussed in the background section, the disclosure provides a ride-sharing framework that is scalable and directly optimizes the carpool dispatching efficiency across temporal and spatial dimensions. The framework may be self-improving by training on the data it generates during operations, which may be made possible through the use of deep reinforcement learning and through iteratively learning and planning on the pooling operations' spatial-temporal effect.

In some embodiments, reinforcement learning within carpool dispatch may be used to balance supply and demand on a ride-hailing system. For example, an AI (artificial intelligence) agent may be trained for dispatching using historical vehicle trajectories and trip data. The agent may be designed to optimize long-term (e.g., daily) objectives such as match rate, receipt payment ratio (RPR), efficiency rate, and finish rate, by learning the hidden patterns in vehicle trajectory data under various supply-demand conditions. The various objectives are described in more detail below. The trained agent may be applied to score each driver-order pair within the dispatching decision-making process. The learning framework is scalable and explicitly optimizes carpool dispatching efficiency across temporal and spatial dimensions.

Figure 1A:
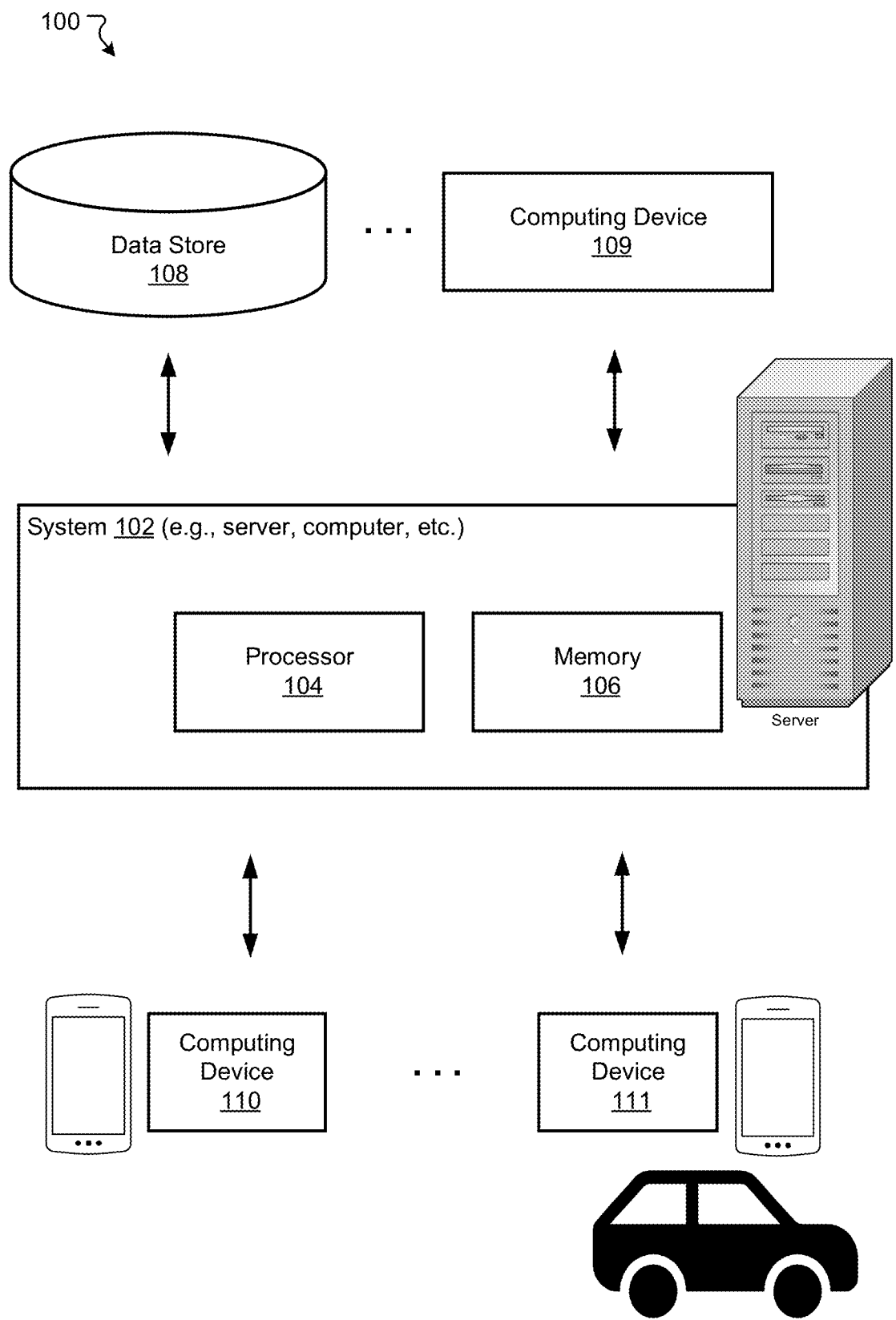
FIG. 1A illustrates an exemplary system for dispatching shared rides, in accordance with various embodiments of the disclosure.

FIG. 1A illustrates an exemplary system 100 for dispatching shared rides, in accordance with various embodiments. The operations shown in FIG. 1A and presented below are intended to be illustrative. As shown in FIG. 1A, the exemplary system 100 may comprise at least one computing system 102 that includes one or more processors 104 and one or more memories 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phones, tablets, servers, computers, wearable devices (smartwatches), etc. The system 102 above may be installed with appropriate software (e.g., platform program, etc.) and/or hardware (e.g., wires, wireless connections, etc.) to access other devices of the system 100.

The system 100 may include one or more data stores (e.g., a data store 108) and one or more computing devices (e.g., a computing device 109) that are accessible to the system 102. In some embodiments, the system 102 may be configured to obtain data (e.g., training data such as location, time, and fees for multiple historical vehicle transportation trips) from the data store 108 (e.g., a database or dataset of historical transportation trips) and/or the computing device 109 (e.g., a computer, a server, or a mobile phone used by a driver or passenger that captures transportation trip information such as time, location, and fees). The system 102 may use the obtained data to train a model for dispatching shared rides through a ride-hailing platform. The location may be transmitted in the form of GPS (Global Positioning System) coordinates or other types of positioning signals. For example, a computing device with GPS capability and installed on or otherwise disposed in a vehicle may transmit such location signal to another computing device (e.g., a computing device of the system 102).

The system 100 may further include one or more computing devices (e.g., computing devices 110 and 111) coupled to the system 102. The computing devices 110 and 111 may comprise devices such as cellphones, tablets, in-vehicle computers, wearable devices (smartwatches), etc. The computing devices 110 and 111 may transmit or receive data to or from the system 102.

In some embodiments, the system 102 may implement an online information or service platform. The service may be associated with vehicles (e.g., cars, bikes, boats, airplanes, etc.), and the platform may be referred to as a vehicle platform (alternatively as service hailing, ride-hailing, or ride order dispatching platform). The platform may accept requests for transportation, identify vehicles to fulfill the requests, arrange for passenger pick-ups, and process transactions. For example, a user may use the computing device 110 (e.g., a mobile phone installed with a software application associated with the platform) to request a transportation trip arranged by the platform. The system 102 may receive the request and relay it to various vehicle drivers (e.g., by posting the request to a software application installed on mobile phones carried by the drivers). Each vehicle driver may use the computing device 111 (e.g., another mobile phone installed with the application associated with the platform) to accept the posted transportation request and obtain pick-up location information. Fees (e.g., transportation fees) can be transacted among the system 102 and the computing devices 110 and 111 to collect trip payment and disburse driver income. Some platform data may be stored in the memory 106 or retrievable from the data store 108 and/or the computing devices 109, 110, and 111. For example, for each trip, the location of the origin and destination (e.g., transmitted by the computing device 110), the fee, and the time can be obtained by the system 102.

In some embodiments, the system 102 and the one or more of the computing devices (e.g., the computing device 109) may be integrated into a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet) through which data can be communicated.

Figure 1B:
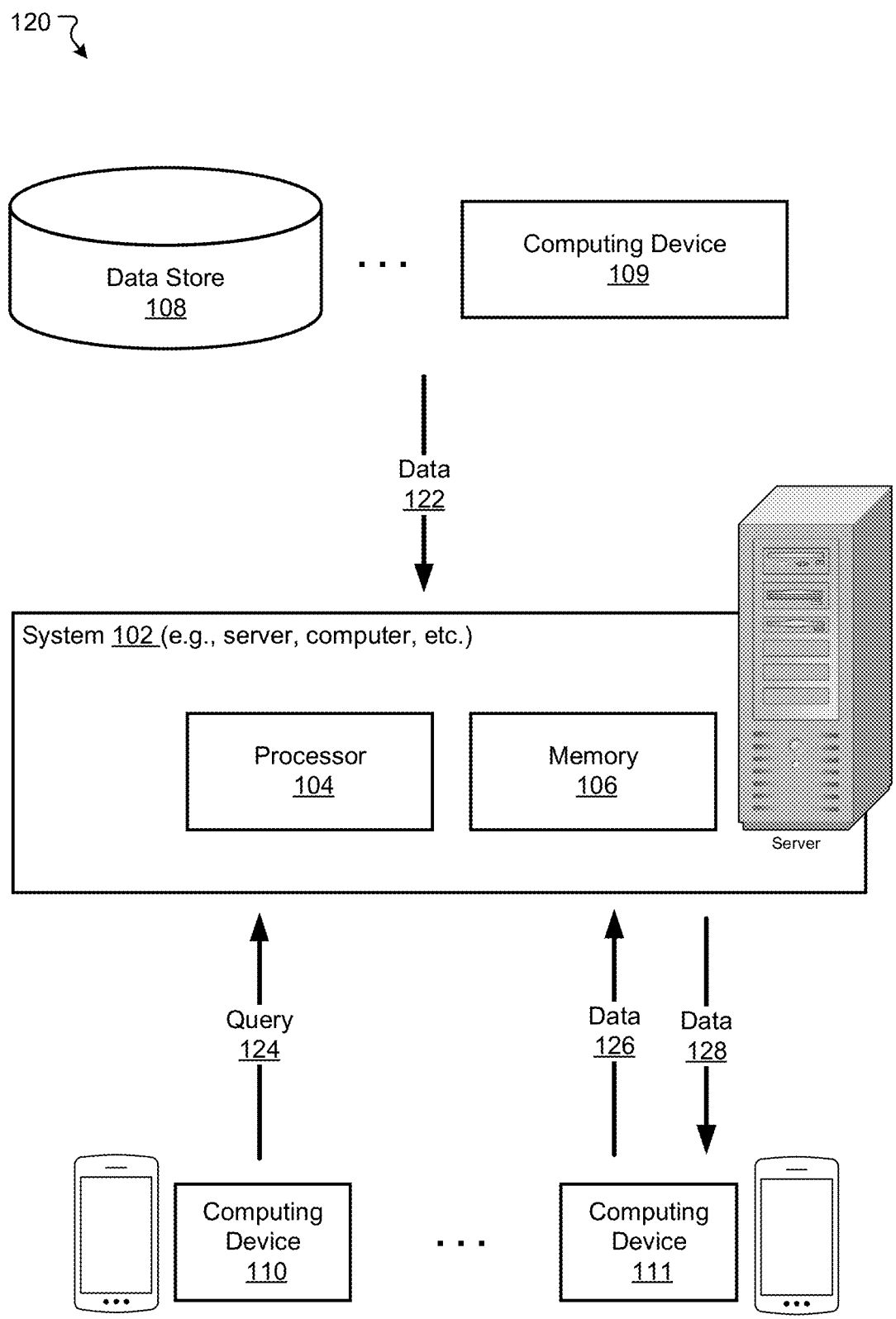
FIG. 1B illustrates an exemplary system for dispatching shared rides, in accordance with various embodiments of the disclosure.

FIG. 1B illustrates an exemplary system 120 for dispatching shared rides, in accordance with various embodiments. The operations shown in FIG. 1B and presented below are intended to be illustrative. In various embodiments, the system 102 may obtain data 122 (e.g., training data such as historical data) from the data store 108 and/or the computing device 109. The historical data may comprise, for example, historical vehicle trajectories and corresponding trip data such as time, origin, destination, fee, etc. The obtained data 122 may be stored in the memory 106. The system 102 may train a model with the obtained data 122. More details of problem formulation and model training are described below with reference to steps 201-203 in FIG. 2.

In some embodiments, the computing device 110 may transmit a query 124 to the system 102. The computing device 110 may be associated with a passenger seeking a carpool transportation ride. The query 124 may comprise information such as current date and time, trip information (e.g., origin, destination, fees), etc. In the meanwhile, the system 102 may have been collecting data 126 from a plurality of computing devices such as the computing device 111. The computing device 111 may be associated with a driver of a vehicle described herein (e.g., taxi, a service-hailing vehicle). The data 126 may comprise information such as a current location of the vehicle, a current time, an on-going trip (origin, destination, time, fees) associated with the vehicle, etc. The driver fee is an income to the driver and a cost to the ride-hailing platform. The driver fee may be estimated or determined based on a travel distance or travel time for performing a transportation order. The on-going trip may refer to (1) an order for which the vehicle has picked up passenger(s) but has not delivered the passenger(s) to their destinations, and/or (2) an order for which the vehicle has been assigned a transportation trip but has not picked up the passenger(s) of this transportation trip. The vehicle may have one or more on-going trips and may be selected for pooling more transportation trips if there is at least one vacant seat. For example, a vehicle having four-passenger seats has one passenger of a first transportation order onboard, and is on its way to pick up another passenger of a second transportation order. This vehicle may be further assigned a third transportation order to pool one more passenger.

In some embodiments, when making the assignment, the system 102 may send data 128 to the computing device 111 or one or more other devices. The data 128 may comprise an instruction or recommendation for an action, such as re-positioning to another location, accepting a new order (including, for example, origin, destination, fee), etc. In one embodiment, the vehicle may be an autonomous vehicle, and the data 128 may be sent to an in-vehicle computer, causing the in-vehicle computer to send instructions to various components (e.g., motor, steering component) of the vehicle to proceed to a location to pick up a passenger for the assigned transportation trip. More details are described below with reference to step 204 in FIG. 2.

Figure 2:
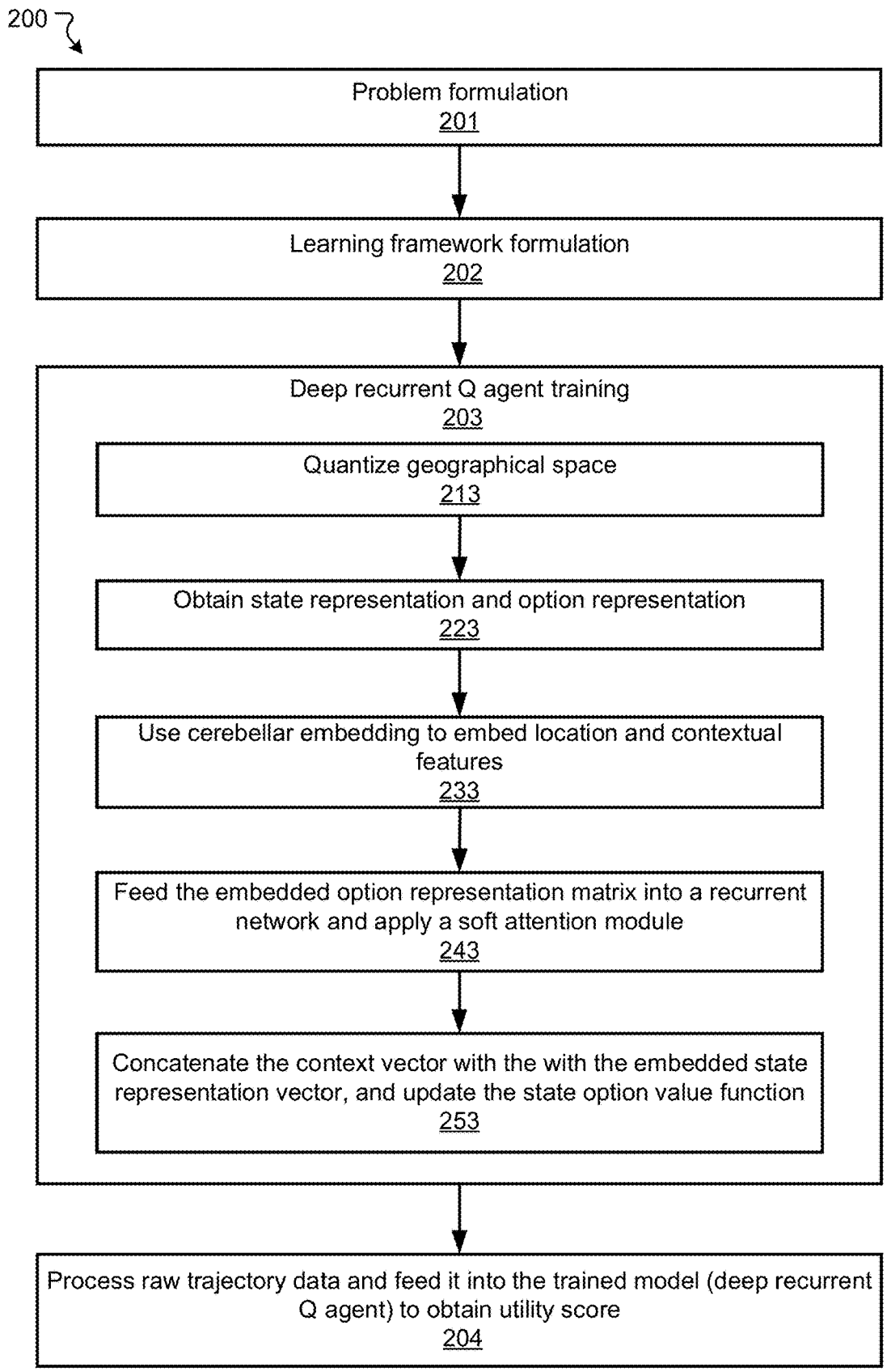
FIG. 2 illustrates an exemplary method for dispatching shared rides, in accordance with various embodiments of the disclosure.

FIG. 2 illustrates an exemplary method 200 for dispatching shared rides, in accordance with various embodiments. The operations shown in FIG. 2 and presented below are intended to be illustrative.

In some embodiments, at Step 201 problem formulation, the long-term objective of the reinforcement learning agent may be formulated as in Equation (1) described below, where the goal is to maximize the total utilities of dispatching. The utility score in the long-term objective may indicate the long-term value of matching a particular driver with an outstanding order. The "long-term" may cover a period of time such as one day, one week, etc. The agent described below at Step 203 may be trained to predict utility scores of hypothetical carpool dispatching. The objective itself may be solved by a standard matching algorithm.

In some embodiments, the carpool dispatching may be decomposed as a sequential decision process with shared orders dispatched one at a time in a series of decision steps. In one example, at each step, data of outstanding drivers and orders is collected, and a matching problem is formulated to optimally assign the orders with the set of drivers. For this step, assignment constraints may be imposed such that an order is assigned to one driver and that a driver is assigned to one order.

In some embodiments, in the context of carpool dispatching described herein, drivers in the current decision step may or may not have already been carrying one or more passengers on board for one or more on-going orders (alternatively referred to as on-board orders). Whether or not a driver has already been carrying one or more passengers on board for one or more on-going orders, the driver will be considered in the next decision step as long as there are still one or more vacant seats on the vehicle.

In some embodiments, the problem formulation is described in Equation (1), where the objective is to maximize the total utilities of the assignments $$\text{argmax}_{x \in C} \sum_{i=1}^{m} \sum_{j=1}^{n} \rho_{ij} x_{ij},$$

where $\{x_{ij}\}$ are binary decision variables subject to a set of constraints C to ensure the feasibility of the final assignment solution, e.g., each order is at most assigned to one driver, etc. Utility scores $\rho_{ij}$ indicate the value of matching each driver i and order j pair. Equation (1) may be solved by standard matching algorithms, such as the Hungarian algorithm (also referred to as the KM algorithm).

$$\text{argmax}_{x_{ij}} \sum_{i=1}^{m} \sum_{j=1}^{n} \rho_{ij} x_{ij} \qquad (1)$$

$$\text{s.t.} \sum_{i=0}^{m} x_{ij} \leq 1, j = 1, 2, 3, \ldots, n \qquad (2)$$

$$\sum_{j=0}^{n} x_{ij} \leq 1, i = 1, 2, 3, \ldots, m.$$

where $$x_{i,j} = \begin{cases} 1, & \text{if driver } i \text{ is assigned to order } j; \\ 0, & \text{if driver } i \text{ is not assigned to order } j \end{cases}.$$

Utility scores p may play an important role in this framework. It may be shown that for each dispatching decision there exists a set of p that yield the same decision through the solution of Equation (1). In one embodiment, to determine the value of ρ in Equation (1), in carpool dispatching, $\rho_{ij}$ needs to also account for the "pooling" effect between the order j and all the outstanding order(s) a driver i may already have on board. An ideal scenario, for example, would be that both the order j and the order(s) onboard share the same destination. In that ideal case, taking up an extra order j is unlikely to cost the driver much more effort than completing the existing order(s) on board, while the revenue is essentially doubled. On the other hand, by executing the order assignment, the driver will need to travel to the destination of the order, which may be in a rural area and require significant repositioning effort from the driver to be able to receive his next order. Hence, the value of p needs to not only capture the immediate "pooling" effect, but also the aftereffect of the action as well. To that end, this intuition may be formalized, and the learning of p may be formulated as a deep reinforcement learning problem. As described herein, with careful arrangements, it is possible to significantly improve the decision-making process through learning from historical experiences.

In some embodiments, at Step 202 learning framework formulation, the vehicle trajectory within the carpool dispatching system may be formulated as a Semi-Markov Decision Process (SMDP) with a set of options (e.g., interruption options). Detailed definitions of state, options, and rewards can be found below with respect to Deep Q learning. Vehicle trajectory data will be pre-processed to the corresponding formats, and then feed into the deep Q learning model. On each time step t, the driver transitions from $s_t$ to $s_{t'}$, while receiving a reward $r_i$ for each time step i from t to t', by executing an option $o_t$ that can be either an idle movement or an order assignment. The reward may comprise, for example, income/driver_fee, where income represents passenger-paid fees (a benefit to the ride-hailing platform), and driver_fee stands for an income to the driver (a cost to the ride-hailing platform). A portion of the passenger-paid fees may be paid to the driver, while the rest may go to the platform, etc. An idle option terminates when the driver receives an order assignment, at which time the driver switches to executing the trip option.

In one embodiment, a day may correspond to one episode comprising T time steps. The discounted total income of a driver starting from any given time step t till the end of an episode is denoted as $$R_t^{\gamma} = \sum_{i=t}^{T} \gamma^{i-t} r_i.$$

The state value function is thus the expectation of the discounted total income starting from a given state $V(s_t)$ $=E\{R_t^{\gamma}|s_t\}$. The state option value function is given by the Bellman equation for SMDP $$Q(s_t, o_t) = \sum_{i=t}^{t'-1} \gamma^{i-t} r_i + \gamma^{t'-t} * E\{R_{t'}^{\gamma} | s_{t'}\} \qquad (3)$$

$$= \hat{r}_t + \gamma^{t'-t} * V(s_{t'}) \qquad (4)$$

where t' is the termination time for the option $o_t$, $\hat{r}_t$ is the total discounted reward received through the whole transition process, and γ is a discount factor. Since a future state $s_{t'}$ is used to update a current state $s_t$, the discount factor is used to adjust the impact of a future value to a current value. The impact of the discount factor (as reflected by the discount factor) decreases as the future value is further away in time. The discount factor may be set as a hyperparameter.

In some embodiments, at Step 203, the deep recurrent Q agent may be trained using the pre-processed data from Step 202. An example of the model structure is shown in FIG. 3.

Figure 3:
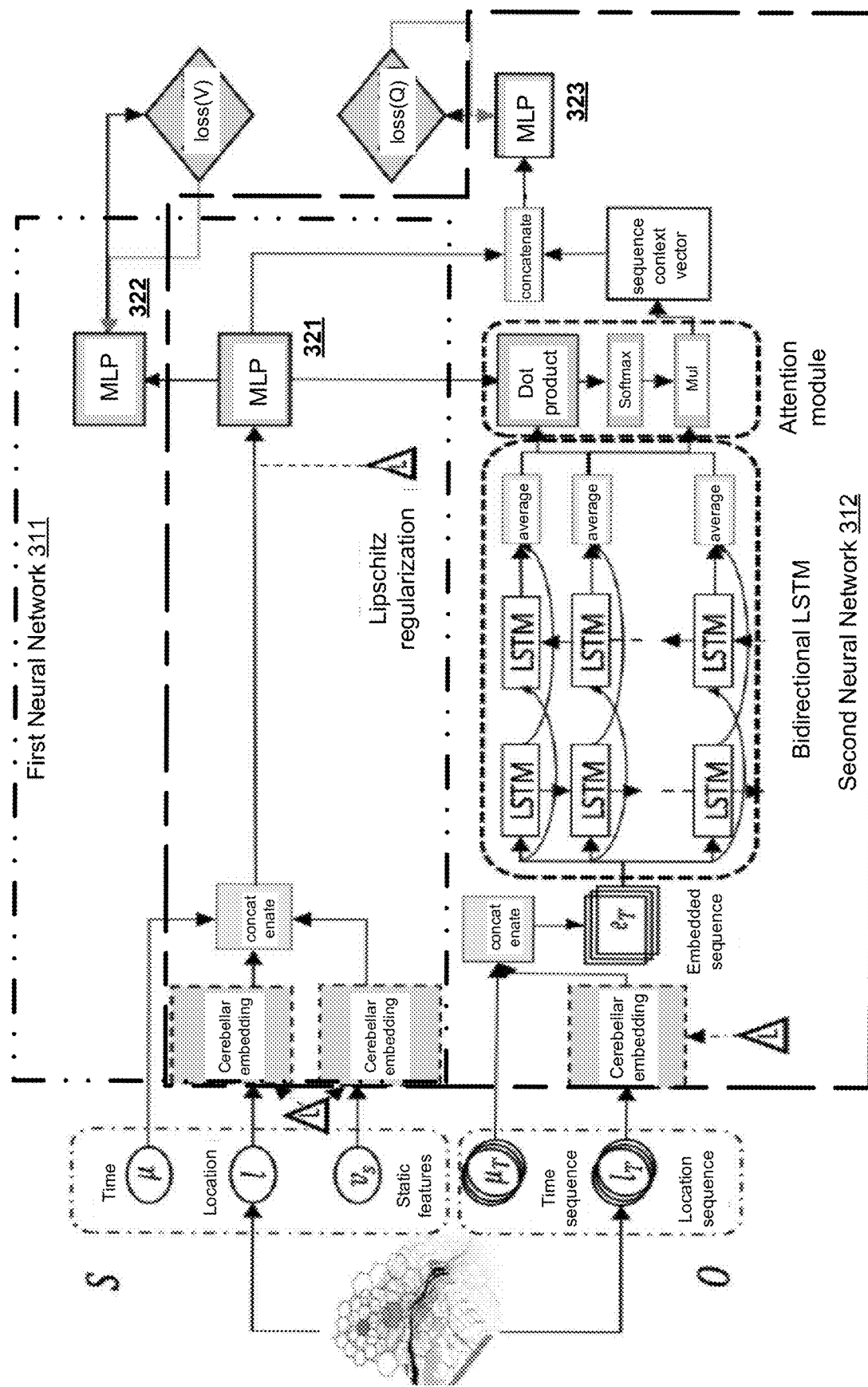
FIG. 3 illustrates an exemplary model for dispatching shared rides, in accordance with various embodiments.

FIG. 3 illustrates an exemplary model for dispatching shared rides, in accordance with various embodiments. The operations shown in FIG. 3 and presented below are intended to be illustrative.

Referring to FIG. 2 and FIG. 3, step 203 may comprise sub-steps 213-253. At Step 213, a hierarchical hexagon tiling system may be used to quantize the geographical space. At Step 223, the state representation S and the option representation 0 may be obtained. At Step 233, cerebellar embedding may be used to embed location and contextual features. At Step 243, the embedded option representation matrix may be fed into a recurrent network (e.g., bidirectional LSTM network), and a soft attention module may be applied on the output matrix of bidirectional LSTM network with the embedded state representation vector. The result is a weighted sum context vector. At Step 253, the context vector may be concatenated with the embedded state representation vector, and the state option value function Q (s, o) may be updated via Equation 5; the state value function V(s) may be updated via Equation 6, but only using the embedded state representation vector. For both Q and V, the squared loss may be used, and the whole network may be updated by standard backpropagation with gradient descent.

In some embodiments, the Bellman equation for the SMDP in Equation (3) may be used to update the state option value function in a deep Q learning framework. For each transition, a driver's spatial and temporal characteristics may be described by feature vectors, $s_t$, $s_{t'}$, ∈ S. The driver may have on-board orders and/or have been dispatched to an order but have not picked up the passenger. For the first and the last such orders within the transition, t and t' are the broadcasting and the delivery time, respectively. For example, S may be defined as a set of the driver's geographical status ɩ, the time stamp μ, and the static contextual feature $v_s$ such as the date. In some embodiments, a hierarchical hexagon tiling system may be used to quantize the geographical space and obtain ɩ. A geographical region may be divided into repeating units of hexagonal tiles, and the tiles may be used to locating vehicles. In some examples, two or more tiers of hexagonal tiles may be used. For instance, at a first tier, a city region may be divided into repeating units of large hexagonal tiles to coarse-code the location status of each vehicle (that is, coarsely locating in which large tile each vehicle is located). At a second-tier, each large tile may be subdivided into repeating units of small hexagonal tiles to more accurately locate each vehicle. In some embodiments, similarly, the option, $o_t$ ∈ O, comprises geographical and time status of all dispatched order (order dispatched but the passenger(s) not yet picked up) and onboard orders (order dispatched and the passenger(s) picked up) corresponding to respective vehicles within the transition from t to t'(also referred to as a time step). The time step may correspond to a period from an order dispatch until a next order dispatch to the same vehicle. Thus, the length of a time step may not be fixed. For each order during a transition, the broadcasting and delivery time stamps and their corresponding driver's coarse-coded location status may be taken as a bundle. Then, all bundles of time stamps and locations may be sorted by either broadcasting or delivery time. The resulted time sequence $μ_T$ and location sequence $ɩ_T$ may be used to describe $o_t$, where T is the number of timestamps. Carpool dispatching aims to not only optimize an individual driver's income, but also balance the discrepancy between the number of available drivers (supply) and the number of passengers (demand) in the system. To this end, reward $r_t$, after executing an option $o_t$, may be formulated as $$r_t = \frac{gmv_t}{driver\_fee_t},$$
$$r_t \geq 1,$$

where $gmv_t$ is the gross merchandise value (total value paid by all passengers within the transition), and $driver\_fee_t$ is the total driver income obtained from the transition. Since driver income of a pooled trip is calculated purely based on trip mileage and duration, the higher $r_t$ is, the more orders a driver is likely to serve with higher efficiency. Assuming that $r_t$ is spread uniformly across the transition, then $\hat{r}_t$ becomes the sum of a geometric sequence, and the updated rules for Q and V are:

$$Q(s_t, o_t) \leftarrow \frac{r_t(\gamma^{t'-t}-1)}{(t'-t)(\gamma-1)} + \gamma^{t'-t} * V(s_{t'}) \quad (5)$$

$$V(s_t) \leftarrow \frac{r_t(\gamma^{t'-t}-1)}{(t'-t)(\gamma-1)} + \gamma^{t'-t} * V(s_{t'}) \quad (6)$$

Data sets ($s_t$, $o_t$, $r_t$, $s'_t$) as described above may be gathered from historical vehicle trajectories, and a neural network (e.g., a sequence-based deep Q learning model, the structure of which is shown in FIG. 3) may be used to approximate Q and V.

In some embodiments, referring to FIG. 3, the reinforcement learning agent is further configured to: apply cerebellar embedding to each of the locations in the historical data and the one or more static features in the historical data to output a processed location and one or more processed static features; concatenate the timestamp in the historical data, the processed location, and the one or more processed static features to output a first concatenation; feed the first concatenation to a first multilayer perceptron 321; and feed an output of the first multilayer perceptron 321 to a second multilayer perceptron 322 (e.g., nonlinearity may be added by adding a fully connect layer to the first multilayer perceptron 321 to obtain the second multilayer perceptron 322); and training the machine learning model comprises optimizing one or more parameters of the first neural network by minimizing the first loss function based on the reward and an output of the second multilayer perceptron 322.

In some embodiments, referring to FIG. 3, the reinforcement learning agent is further configured to: apply cerebellar embedding to the location sequence to output a processed location sequence; concatenate the time sequence and the processed location sequence to output a second concatenation; embed the second concatenation to output an embedded sequence; feed the embedded sequence to a bidirectional long short-term memory network (LSTM) of the second neural network to output an LSTM output; feed the LSTM output and the first multilayer perceptron 321 to an attention module of the second neural network to output a sequence context vector; concatenate the first multilayer perceptron 321 and the sequence context vector to obtain a third concatenation; and feed the third concatenation to a third multilayer perceptron 323 (e.g., nonlinearity may be added by adding a fully connect layer to the third concatenation to obtain the third multilayer perceptron 323); and training the machine learning model comprises optimizing one or more parameters of the second neural network by minimizing the second loss function based on the reward and an output of the third multilayer perceptron 323.

That is, an embedding method, cerebellar embedding, may be used to obtain distributed, robust, and generalizable feature representations of ɩ, $ɩ_T$, and $v_s$. The embedded sequence $e_T$, containing $μ_T$ and cerebellar embedded $ɩ_T$, is then fed into a bidirectional LSTM network, where every two adjacent vectors ($e_i$, $e_{i+1}$) of the embedded sequence (i ∈ T, i(mod 2)≡1) represents a dispatched or on-board order. The two adjacent vectors may represent a state of the order respectively at its origin and destination. The hidden outputs of the forward and backward LSTM cells are averaged, sharing the same dimension with the dense representation of state after a multilayer perceptron layer.

The order of the transitions may be important to a pooling trip. Different sequences of assignments may lead to different sets of routes for a vehicle to traverse, and thus different trip durations and different driver fees consequently. In another example, for a carpool trip of passengers A, B, and C, different orders of passenger pickup and drop-off may significantly affect the long-term value. The last drop-off location may directly impact the future supply-demand across the region. In yet another example, a vehicle may be dispatched to pick up passengers A and C from two different orders, and originally instructed to drop off passengers A and C. Then, after picking up passengers A and C, the vehicle may be dispatched another order to pick up B, and scheduled to drop off passenger C, followed by passenger B, and then passenger A. This change in routing would impact the total income of the vehicle driver at the end of the day. These factors are not addressed in the traditional vehicle routing problem (VRP) algorithm that merely makes the determination based on minimizing total travel distance or time. Here, the LSTM network and attention module of the neural network may capture these factors. For example, the change in the state of an existing transportation order is captured when another transportation order is pooled. In some embodiments, to encode this underlying impact into learnable parameters, a soft attention module on state and sequence-based-option representations may be applied. The output context vector is a weighted sum of the sequence representation, which leverages the joint effects of a driver's current spatial-temporal status and subsequent order assignment to achieve higher rewards. For both Q and V, mean squared error may be used as the loss, and their weights may be updated altogether at each iteration. To better ensure the robustness of our model against input perturbations, the Lipschitz regularization may be employed to control the Lipschitz for the cerebellar embedding layer and the multi-layer perceptron layer.

In some embodiments, a difference loss(V) between Equation (6) and a historical current $V(s_t)$ may be obtained. By minimizing a first loss function including a cumulative of the difference loss(V), the first neural network 311 leading to loss(V) in FIG. 3 may be trained. A difference loss(Q) (alternatively referred to as Bellman error) between Equation (5) and a historical current $Q(s_t, o_t)$ may be obtained. By minimizing a second loss function including a cumulative of the difference loss(Q), the second neural network 312 leading to loss(Q) in FIG. 3 may be trained.

In some embodiments, at Step 103, Q and V may be trained for different times of iteration. For example, Q or V may be trained for more times of iteration. As shown above, for a certain vehicle, V may account for different vehicle-order match pairs based on the vehicle location, time, static features, and current order demands, and Q may additionally account for the on-going order(s) of the vehicle.

In some embodiments, at optional Step 204 in the application of the trained model (e.g., deployed in a ride-hailing platform serving drivers and riders, deployed for online testing), raw trajectory data of drivers' vehicles may be collected, processed, and fed into the model (deep recurrent Q agent) to obtain a utility score. In one example, Q(s, o)−V (s) may be used as the result score, where both the state value function V and the state option value function Q (defined in Equations 3 & 4) have been learned at Step 203. How much the system could benefit from a particular option (order assignment) over the average option under that spatiotemporal condition may be observed.

The exemplary benefits of the model are described below. In some embodiments, ride-hailing platforms generate millions of vehicle trajectories per day by completing hundreds of driver-rider transactions every second. Each vehicle trajectory, or trip, is associated with rich spatiotemporal and contextual supply-demand information, as well as analytic metrics such as match rate (for example, representing a proportion of carpool trips), receipt payment ratio (RPR, for example, representing a proportion of estimated driver income with respect to platform real income), efficiency rate (for example, representing a proportion of additional demand satisfied by a given supply of transportation), and finish rate (for example, representing a proportion of finished orders), each indicating how profitable or efficient the trajectory is from hindsight. Exemplary definitions of the metrics are provided below, where eta stands for an estimated time of arrival. RPR may also be regarded as a ratio of gross merchandise value over driver fee, where the gross merchandise value may comprise revenues paid by passengers as a benefit to the ride-hailing platform, and the driver fee may comprise ride mileages or durations which determines the income to the driver.

Match rate=1−1.0*single_order trip/finished_order
RPR=1.0*driver_pre_fee/income
Efficiency rate=match_rate*(0.8*(1.0*order_total_dist/driver_pre_dist−1)+0.2*(1.0*order_total_eta/driver_pre_eta−1))
Finish rate=finished_order/total_order Exemplary definitions of parameters of the metrics are provided below:
single_order trip: a number of trips containing one order
finished_order: a total number of finished orders
total_order: a total number of orders
income: a sum of passenger-paid fee of all orders
order_total_dist: a sum of the estimated distance of all finished orders
order_total_eta: a sum of estimated eta of all finished orders
driver_pre_fee: an estimated total driver income based on trip distance and trip duration
driver_pre_dist: a sum of the estimated trip distance of all drivers
driver_pre_eta: a sum of estimated trip eta of all drivers There are strong patterns hidden in the trajectory data for revealing the best action to take (or the driver-rider pair to match) under various spatiotemporal and supply-demand conditions, e.g., rush hour, rider origin and destination, morning or afternoon, hot or cold area, weekday or weekends, etc. The key to improving the marketplace operation efficiency thus lies in how to leverage those large pools of information and how to learn and benefit from those hidden patterns.

To this end, in some embodiments, an AI agent for carpool dispatching (order-driver matching) may be trained using historical data (e.g., historical vehicle trajectories and trip data). The historical data used for training may comprise millions of vehicle trajectories of ride-hailing vehicles that took place in a past month in a city, along with trip data such as date, time, origin, destination, revenue, etc. The agent is able to make dispatching decisions for optimizing long-term (e.g., day-long) objectives such as RPR, match rate, etc. That may be achieved by applying the agent to appropriately score each driver-rider pair within the dispatching decision-making process.

In some embodiments, a method called policy evaluation in reinforcement learning may be used. The historical trajectories may be evaluated with hindsight according to the metric to be optimized (e.g., match rate, RPR, efficiency rate, finish rate), such that higher-value trajectories may be generated by matching the 'best' driver-rider pair during testing. The model has the capacity to learn and generalize from every possible condition that has ever happened in the large number of transactions collected through historical data (e.g., ride-hailing platform data).

In some embodiments, the trained AI agent may be used to simulate vehicle-order matching in a virtual environment and compare it with a baseline. Results have shown improvement in various metrics such as match rate (increase in value, implying that more drivers are able to pool rides), RPR (decrease in value, implying more income to the ride-hailing platform), efficiency rate (increase in value, implying more ride-hailing demand is satisfied by a given supply of vehicles), finish rate (increase in value, implying more finished orders). In some embodiments, the trained AI agent may be used in a real-life ride-hailing platform to match vehicles and carpool orders.

FIG. 4 illustrates a flowchart of an exemplary method 410 for dispatching shared rides, according to various embodiments of the present disclosure. The method 410 may be implemented in various environments including, for example, by the system 100 of FIG. 1A and FIG. 1B. The exemplary method 410 may be implemented by one or more components of the system 102 (e.g., the one or more computing devices such as servers). For example, a non-transitory computer-readable storage medium (e.g., the memory 106) may store instructions that, when executed by a processor (e.g., the processor 104), cause the system 102 (e.g., the processor 104) to perform the method 410. The operations of method 410 presented below are intended to be illustrative. Depending on the implementation, the exemplary method 410 may include additional, fewer, or alternative steps performed in various orders or in parallel.

Block 412 includes obtaining, at one or more computing devices, a plurality of first signals corresponding to a vehicle (e.g., a physical vehicle in real-time) and a plurality of second signals corresponding to a plurality of candidate carpool combinations each comprising one or more unassigned transportation orders. Thus, the plurality of candidate carpool combinations comprise a plurality of unassigned transportation orders. The first and second signals may be included in the data 122, the query 124, and/or the data 126 in FIG. 1B. The plurality of first signals may include a current time, a location of the vehicle at the current time, and one or more static features corresponding to the vehicle. In some embodiments, the one or more static features corresponding to the vehicle comprise one or more of: date (which may include additional information such as day-of-week, whether it is a public holiday, whether it is a special event day such as a major sports event day or shopping discount day), weather (which may include additional information such as season, temperature, wind condition, air quality, etc.), traffic condition (e.g., a score indicating traffic volume at or near the location of the vehicle), traffic restriction (e.g., roadblocks or vehicle operation restrictions at or near the location of the vehicle), driver record (e.g., a driving or service score of the driver of the vehicle), and driver bio information (e.g., age or credit score of the driver of the vehicle). The location of the vehicle may be transmitted as a GPS or another positioning signal. The location of the vehicle may be transmitted by or collected from a mobile phone of the vehicle driver disposed in the vehicle, an in-vehicle computer, etc. The plurality of second signals may include timestamps (e.g., timestamps when the unassigned transportation orders were sent by a user or received at the one or more computing devices), origins, and destinations of the unassigned transportation orders, and the vehicle has an on-going transportation order at the current time. An "on-going transportation order" may include (1) an order for which the vehicle has picked up passenger(s) but has not delivered the passenger(s) to their destinations, and/or (2) an order for which the vehicle has been assigned a transportation trip but has not picked up the passenger(s) of this transportation trip.

In some embodiments, if a vehicle has no on-going transportation order, the method 410 may be applied to the vehicle after the vehicle is assigned one or more transportation orders (by which the vehicle will have at least one on-going transportation order), as long as the vehicle still has room for pooling more passenger(s). For example, the ride-hailing platform may assign a first transportation order to a vehicle that has no on-going transportation order. Then, before the first transportation order is completed, the ride-hailing platform may perform the method 410 to assign one or more second transportation orders to the vehicle.

In some embodiments, obtaining the plurality of second signals corresponding to the plurality of candidate carpool combinations each comprising one or more unassigned transportation orders includes: selecting, at the one or more computing devices, the plurality of candidate carpool combinations based on the location of the vehicle at the current time, an origin and a destination of the on-going transportation order, the origins and the destinations of the unassigned transportation orders, and one or more settings. For example, the one or more computing devices may execute a VRP algorithm to determine the plurality of candidate carpool combinations. The determination may be made every two seconds for all transportation requests received at the ride-hailing platform. The determination may be based on keeping the total travel distance and/or travel time under a threshold. The one or more settings may include, for example, the threshold.

Block 414 includes inputting, at the one or more computing devices, the plurality of first and second signals to a trained machine learning model.

In some embodiments, the method may further include, before the step 412, training, at the one or more computing devices, a machine learning model to obtain the trained machine learning model. The machine learning model may include a reinforcement learning agent configured to: receive, from historical data (which is used as training data to train the reinforcement learning agent), a plurality of vectors, a plurality of rewards (e.g., rewards of historical transportation orders), and an option representation, wherein the plurality of vectors comprise, for each vehicle in the historical data, a timestamp (e.g., timestamp when the transportation order was sent by a user or received at the one or more computing devices), a location, and one or more static features, and the option representation comprises a time sequence and a location sequence of all transportation orders in the historical data corresponding to respective vehicles in the historical data; feed the plurality of vectors through a first neural network 311 to approximate a first loss function; and feed the plurality of vectors and the option representation through a second neural network 312 to approximate a second loss function. The first and second loss functions are described above.

In some embodiments, the machine learning model is configured to model vehicle trajectories according to a Semi-Markov Decision Process with a set of interruption options; the set of interruption options comprise performing an idle movement (e.g., the vehicle may stay at the same position or move to another location without an order) or assigning a transportation trip; and at each time step, the Semi-Markov Decision Process is configured to transition from a current state to a next state by executing one of the set of interruption options and configured to receive a reward corresponding to the transition. In some embodiments, for each time step, the reward is proportional to a total value paid by all passengers within the time step in the historical data.

In some embodiments, as described with reference to FIG. 3 above, the reinforcement learning agent is further configured to: apply cerebellar embedding to each of the locations in the historical data and the one or more static features in the historical data to output a processed location and one or more processed static features; concatenate the timestamp in the historical data, the processed location, and the one or more processed static features to output a first concatenation; feed the first concatenation to a first multilayer perceptron 321; and feed an output of the first multilayer perceptron 321 to a second multilayer perceptron 322 (e.g., nonlinearity may be added by adding a fully connected layer to the first multilayer perceptron 321 to obtain the second multilayer perceptron 322); and training the machine learning model comprises optimizing one or more parameters of the first neural network by minimizing the first loss function based on the reward and an output of the second multilayer perceptron 322.

In some embodiments, as described with reference to FIG. 3 above, the reinforcement learning agent is further configured to: apply cerebellar embedding to the location sequence to output a processed location sequence; concatenate the time sequence and the processed location sequence to output a second concatenation; embed the second concatenation to output an embedded sequence; feed the embedded sequence to a bidirectional long short-term memory (LSTM) network of the second neural network to output an LSTM output; feed the LSTM output and the first multilayer perceptron 321 to an attention module of the second neural network to output a sequence context vector; concatenate the first multilayer perceptron 321 and the sequence context vector to obtain a third concatenation; and feed the third concatenation to a third multilayer perceptron 323 (e.g., nonlinearity may be added by adding a fully connect layer to the third concatenation to obtain the third multilayer perceptron 323); and training the machine learning model comprises optimizing one or more parameters of the second neural network by minimizing the second loss function based on the reward and an output of the third multilayer perceptron 323.

In some embodiments, as described with reference to FIG. 3 above, every two adjacent vectors fed to the bidirectional LSTM network correspond to an on-going transportation order; and the bidirectional LSTM network is configured to, for all timestamps in the historical data, average hidden outputs of forward and backward LSTM cells corresponding to the timestamp to obtain a plurality of averages and configured to concatenate the averages. In some embodiments, the attention module is configured to: obtain a dot product of the concatenated average and the first multilayer perceptron; apply a softmax function to the dot product; and apply a multiplication operation to an output of the softmax function to output the sequence context vector.

Block 416 includes obtaining, at the one or more computing devices from an output of the trained machine learning model, a utility score of each of the plurality of candidate carpool combinations.

In some embodiments, training the machine learning model comprises maximizing a utility function (e.g., Equation (1)) comprising a cumulative sum of a plurality of products each between a utility score $\rho_{ij}$ and a binary decision variable $x_{ij}$ over an episode; the utility score encodes a long-term value to a ride-hailing platform of matching a vehicle-order pair in a carpool; and the utility function is subject to a set of constraints (e.g., Equation (2)) comprising that each transportation order is assigned to at most one vehicle. In some embodiments, maximizing the utility function comprises solving the utility function by executing a Hungarian algorithm.

In some embodiments, training the machine learning model comprises training the first neural network and the second neural network at different frequencies (e.g., training for different times of iterations); and the utility score comprises (1) an output of the trained second neural network (e.g., Q), or (2) a difference between the output of the trained second neural network and an output of the trained first neural network (e.g., Q–V). In some embodiments, using Q–V may be more accurate than Q.

In some embodiments, the utility score captures (1) an immediate effect to the ride-hailing platform of a pool trip corresponding to the on-going transportation order and the one candidate carpool combination, and (2) an aftereffect of available vehicle supply at a final destination of the pooled trip when the vehicle finished the pooled trip.

Block 418 includes, according to the utility score of each of the plurality of candidate carpool combinations, matching, at the one or more computing devices, one of the plurality of candidate carpool combinations with the vehicle for pooling the on-going transportation order and the one candidate carpool combination. For example, a vehicle already having passenger X of order X on-board may be matched with a second order of passenger Y of order Y and a passenger Z of order Z according to the best utility score of picking up Z before Y and dropping off passengers Y and X together (at the same destination) before dropping off Z.

Block 420 includes transmitting, at the one or more computing devices, a dispatch signal to a computing device corresponding to the vehicle (e.g., driver's mobile phone, in-vehicle computer) based on the match for the vehicle to pool passengers corresponding to the on-going transportation order and the one candidate carpool combination. The dispatch signal may be included in the data 128 in FIG. 1B.

Figure 5:
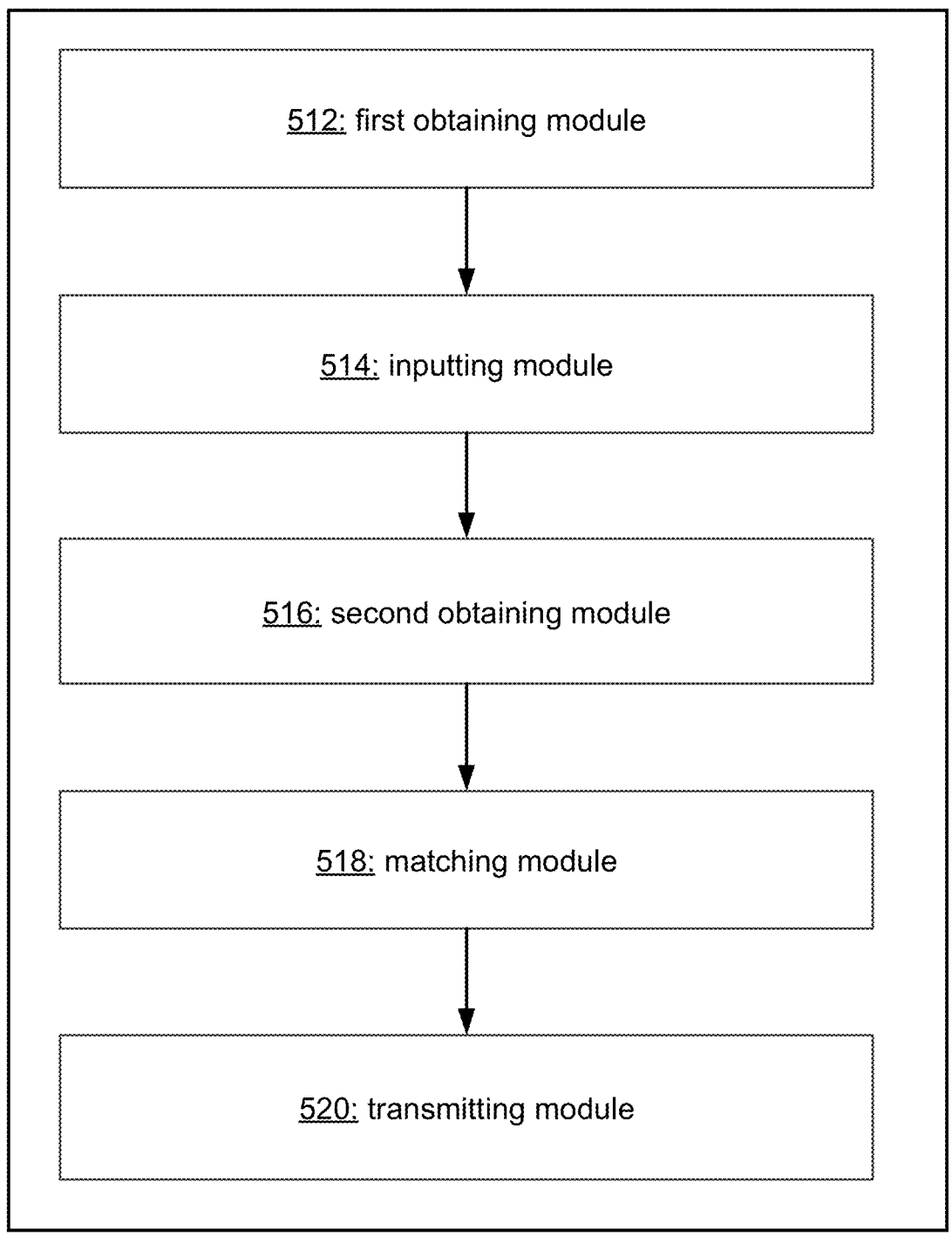
FIG. 5 illustrates an exemplary system for dispatching shared rides, in accordance with various embodiments.

FIG. 5 illustrates a block diagram of an exemplary computer system 510 for dispatching shared rides, in accordance with various embodiments. The system 510 may be an exemplary implementation of the system 102 of FIG. 1A and FIG. 1B or one or more similar devices. The method 410 may be implemented by the computer system 510. The computer system 510 may include one or more processors and one or more non-transitory computer-readable storage media (e.g., one or more memories) coupled to the one or more processors and configured with instructions executable by the one or more processors to cause the system or device (e.g., the processor) to perform the method 410. The computer system 510 may include various units/modules corresponding to the instructions (e.g., software instructions).

In some embodiments, the computer system 510 may include a first obtaining module 512 configured to obtain a plurality of first signals corresponding to a vehicle and a plurality of second signals corresponding to a plurality of candidate carpool combinations each comprising one or more unassigned transportation orders, wherein: the plurality of first signals comprise a current time, a location of the vehicle at the current time, and one or more static features corresponding to the vehicle, the plurality of second signals comprise timestamps, origins, and destinations of the unassigned transportation orders, and the vehicle has an on-going transportation order at the current time; an inputting module 514 configured to input the plurality of first and second signals to a trained machine learning model; a second obtaining module 516 configured to obtain, from an output of the trained machine learning model, a utility score of each of the plurality of candidate carpool combinations; a matching module 518 configured to, according to the utility score of each of the plurality of candidate carpool combinations, match one of the plurality of candidate carpool combinations with the vehicle for pooling the on-going transportation order and the one candidate carpool combination; and a transmitting module 520 configured to transmit a dispatch signal to a computing device corresponding to the vehicle based on the match for the vehicle to pool passengers corresponding to the on-going transportation order and the one candidate carpool combination.

Figure 6:
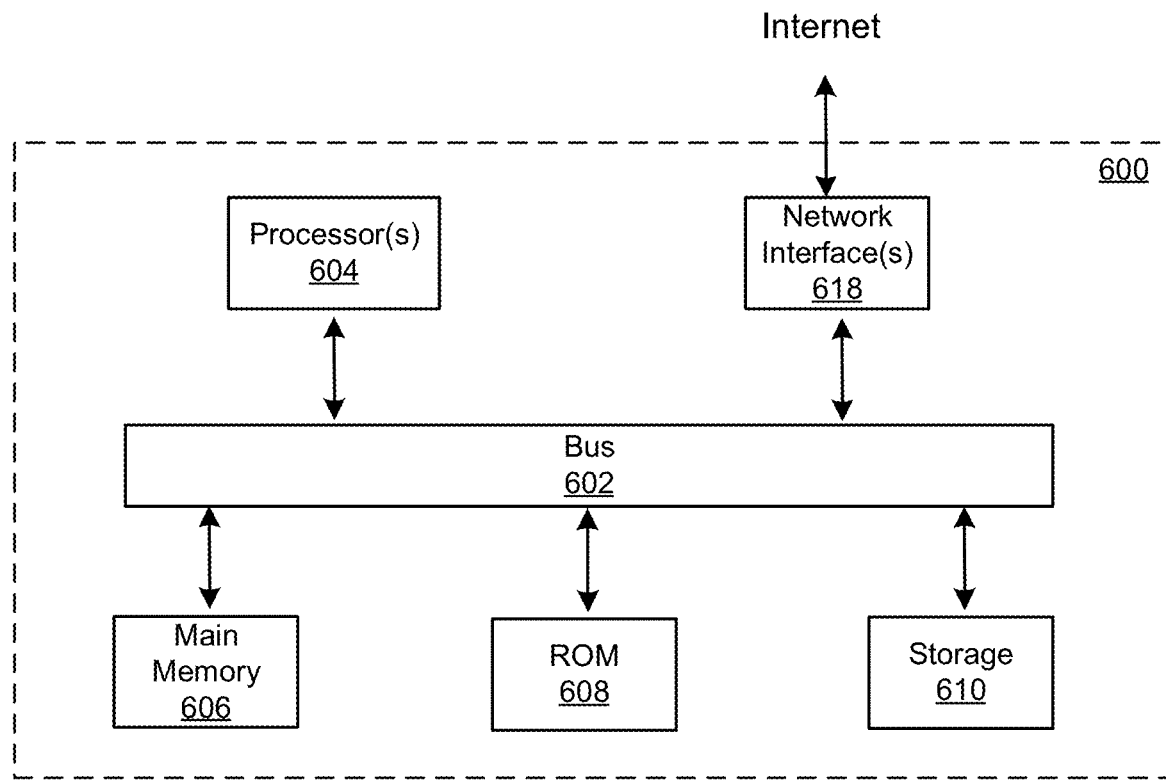
FIG. 6 illustrates a block diagram of an exemplary computer system in which any of the embodiments described herein may be implemented.

FIG. 6 is a block diagram that illustrates a computer system 600 upon which any of the embodiments described herein may be implemented. The system 600 may correspond to the system 190 or the computing device 109, 110, or 111 described above. The computer system 600 includes a bus 602 or another communication mechanism for communicating information, one or more hardware processors 604 coupled with bus 602 for processing information. Hardware processor(s) 604 may be, for example, one or more general-purpose microprocessors.

The computer system 600 also includes a main memory 606, such as a random access memory (RAM), cache, and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The computer system 600 further includes a read-only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may implement the techniques described herein using customized hard-wired logic, one or more ASICs or FPGAs, firmware, and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The main memory 606, the ROM 608, and/or the storage 610 may include non-transitory storage media. The term "non-transitory media," and similar terms, as used herein refers to a media that store data and/or instructions that cause a machine to operate in a specific fashion. The media excludes transitory signals. Such non-transitory media may include non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge, and networked versions of the same.

The computer system 600 also includes a network interface 618 coupled to bus 602. Network interface 618 provides a two-way data communication coupling to one or more network links that are connected to one or more local networks. For example, network interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic, or optical signals that carry digital data streams representing various types of information.

The computer system 600 can send messages and receive data, including program code, through the network(s), network link, and network interface 618. In the Internet example, a server might transmit a requested code for an application program through the Internet, the ISP, the local network, and the network interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors including computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be included in program codes or instructions stored in a memory (e.g., a non-transitory computer-readable storage medium described above). Such algorithm may include a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
   obtaining, at one or more computing devices, a plurality of first signals corresponding to a vehicle and a plurality of second signals corresponding to a plurality of candidate carpool combinations each comprising one or more unassigned transportation orders, wherein:
   the plurality of first signals comprise a current time, a location of the vehicle at the current time, and one or more static features corresponding to the vehicle,
   the plurality of second signals comprise timestamps, origins, and destinations of the unassigned transportation orders, and
   the vehicle has an on-going transportation order at the current time;
   inputting, at the one or more computing devices, the plurality of first and second signals to a trained machine learning model;
   obtaining, at the one or more computing devices from an output of the trained machine learning model, a utility score of each of the plurality of candidate carpool combinations;
   according to the utility score of each of the plurality of candidate carpool combinations, matching, at the one or more computing devices, one of the plurality of candidate carpool combinations with the vehicle for pooling the on-going transportation order and the one candidate carpool combination; and
   transmitting, at the one or more computing devices, a dispatch signal to a computing device corresponding to the vehicle based on the match.

2. The method of claim 1, wherein:
   the one or more static features corresponding to the vehicle comprise one or more of: date, weather, traffic condition, traffic restriction, driver record, and driver bio information.

3. The method of claim 1, wherein obtaining the plurality of second signals corresponding to the plurality of candidate carpool combinations each comprising one or more unassigned transportation orders comprises:
   selecting, at the one or more computing devices, the plurality of candidate carpool combinations based on the location of the vehicle at the current time, an origin and a destination of the on-going transportation order, the origins and the destinations of the unassigned transportation orders, and one or more settings.

4. The method of claim 1, further comprising training, at the one or more computing devices, a machine learning model to obtain the trained machine learning model, wherein the machine learning model comprises a reinforcement learning agent configured to:
   receive, from historical data, a plurality of vectors, a plurality of rewards, and an option representation, wherein:
   the plurality of vectors comprise, for each vehicle in the historical data, a timestamp, a location, and one or more static features, and
   the option representation comprises a time sequence and a location sequence of all transportation orders in the historical data corresponding to respective vehicles in the historical data;
   feed the plurality of vectors through a first neural network to approximate a first loss function; and
   feed the plurality of vectors and the option representation through a second neural network to approximate a second loss function.

5. The method of claim 4, wherein:
   the machine learning model is configured to model vehicle trajectories according to a Semi-Markov Decision Process with a set of interruption options;

the set of interruption options comprise performing an idle movement or assigning a transportation trip; and at each time step, the Semi-Markov Decision Process is configured to transition from a current state to a next state by executing one of the set of interruption options and configured to receive a reward corresponding to the transition.

6. The method of claim 4, wherein:

for each time step, the reward is proportional to a total value paid by all passengers within the time step in the historical data.

7. The method of claim 4, wherein:

the reinforcement learning agent is further configured to:
apply cerebellar embedding to each of the locations in the historical data and the one or more static features in the historical data to output a processed location and one or more processed static features;
concatenate the timestamp in the historical data, the processed location, and the one or more processed static features to output a first concatenation;
feed the first concatenation to a first multilayer perceptron; and
feed an output of the first multilayer perceptron to a second multilayer perceptron; and training the machine learning model comprises optimizing one or more parameters of the first neural network by minimizing the first loss function based on the reward and an output of the second multilayer perceptron.

8. The method of claim 7, wherein:

the reinforcement learning agent is further configured to:
apply cerebellar embedding to the location sequence to output a processed location sequence;
concatenate the time sequence and the processed location sequence to output a second concatenation;
embed the second concatenation to output an embedded sequence;
feed the embedded sequence to a bidirectional long short-term memory (LSTM) network of the second neural network to output an LSTM output;
feed the LSTM output and the first multilayer perceptron to an attention module of the second neural network to output a sequence context vector;
concatenate the first multilayer perceptron and the sequence context vector to obtain a third concatenation; and
feed the third concatenation to a third multilayer perceptron; and training the machine learning model comprises optimizing one or more parameters of the second neural network by minimizing the second loss function based on the reward and an output of the third multilayer perceptron.

9. The method of claim 8, wherein:

every two adjacent vectors fed to the bidirectional LSTM network correspond to a transportation order; and the bidirectional LSTM network is configured to, for all timestamps in the historical data, average hidden outputs of forward and backward LSTM cells corresponding to the timestamp to obtain a plurality of averages and configured to concatenate the averages.

10. The method of claim 9, wherein the attention module is configured to:
obtain a dot product of the concatenated average and the first multilayer perceptron;
apply a softmax function to the dot product; and
apply a multiplication operation to an output of the softmax function to output the sequence context vector.

11. The method of claim 4, wherein:

training the machine learning model comprises maximizing a utility function comprising a cumulative sum of a plurality of products each between a utility score and a binary decision variable over an episode;

the utility score encodes a long-term value to a ride-hailing platform of matching a vehicle-order pair in a carpool; and the utility function is subject to a set of constraints comprising that each transportation order is assigned to at most one vehicle.

12. The method of claim 11, wherein:

training the machine learning model comprises training the first neural network and the second neural network at different frequencies; and the utility score comprises (1) an output of the trained second neural network, or (2) a difference between the output of the trained second neural network and an output of the trained first neural network.

13. The method of claim 11, wherein:

maximizing the utility function comprises solving the utility function by executing a Hungarian algorithm.

14. The method of claim 11, wherein:

the utility score captures (1) an immediate effect to the ride-hailing platform of a pool trip corresponding to the on-going transportation order and the one candidate carpool combination, and (2) an aftereffect of available vehicle supply at a final destination of the pooled trip when the vehicle finished the pooled trip.

15. One or more non-transitory computer-readable storage media storing instructions executable by one or more processors, wherein execution of the instructions causes the one or more processors to perform operations comprising:

obtaining a plurality of first signals corresponding to a vehicle and a plurality of second signals corresponding to a plurality of candidate carpool combinations each comprising one or more unassigned transportation orders, wherein:
the plurality of first signals comprise a current time, a location of the vehicle at the current time, and one or more static features corresponding to the vehicle,
the plurality of second signals comprise timestamps, origins, and destinations of the unassigned transportation orders, and
the vehicle has an on-going transportation order at the current time;

inputting the plurality of first and second signals to a trained machine learning model;

obtaining, from an output of the trained machine learning model, a utility score of each of the plurality of candidate carpool combinations;

according to the utility score of each of the plurality of candidate carpool combinations, matching one of the plurality of candidate carpool combinations with the vehicle for pooling the on-going transportation order and the one candidate carpool combination; and transmitting a dispatch signal to a computing device corresponding to the vehicle based on the match for the vehicle to pool passengers corresponding to the on-going transportation order and the one candidate carpool combination.

16. The one or more non-transitory computer-readable storage media of claim 15, wherein:

the one or more static features corresponding to the vehicle comprise one or more of: date, weather, traffic condition, traffic restriction, driver record, and driver bio information.

17. The one or more non-transitory computer-readable storage media of claim 15, wherein obtaining the plurality of second signals corresponding to the plurality of candidate carpool combinations each comprising one or more unassigned transportation orders comprises:

selecting, at the one or more computing devices, the plurality of candidate carpool combinations based on the location of the vehicle at the current time, an origin and a destination of the on-going transportation order, the origins and the destinations of the unassigned transportation orders, and one or more settings.

18. The one or more non-transitory computer-readable storage media of claim 15, further comprising training, at the one or more computing devices, a machine learning model to obtain the trained machine learning model, wherein the machine learning model comprises a reinforcement learning agent configured to:

receive, from historical data, a plurality of vectors, a plurality of rewards, and an option representation, wherein:
  the plurality of vectors comprise, for each vehicle in the historical data, a timestamp, a location, and one or more static features, and
  the option representation comprises a time sequence and a location sequence of all transportation orders in the historical data corresponding to respective vehicles in the historical data;

feed the plurality of vectors through a first neural network to approximate a first loss function; and feed the plurality of vectors and the option representation through a second neural network to approximate a second loss function.

19. The one or more non-transitory computer-readable storage media of claim 18, wherein:

the machine learning model is configured to model vehicle trajectories according to a Semi-Markov Decision Process with a set of interruption options;

the set of interruption options comprise performing an idle movement or assigning a transportation trip; and at each time step, the Semi-Markov Decision Process is configured to transition from a current state to a next state by executing one of the set of interruption options and configured to receive a reward corresponding to the transition.

20. A system comprising one or more processors and one or more non-transitory computer-readable memories coupled to the one or more processors and configured with instructions executable by the one or more processors to cause the system to perform operations comprising:

obtaining a plurality of first signals corresponding to a vehicle and a plurality of second signals corresponding to a plurality of candidate carpool combinations each comprising one or more unassigned transportation orders, wherein:
  the plurality of first signals comprise a current time, a location of the vehicle at the current time, and one or more static features corresponding to the vehicle,
  the plurality of second signals comprise timestamps, origins, and destinations of the unassigned transportation orders, and
  the vehicle has an on-going transportation order at the current time;

inputting the plurality of first and second signals to a trained machine learning model;

obtaining, from an output of the trained machine learning model, a utility score of each of the plurality of candidate carpool combinations;

according to the utility score of each of the plurality of candidate carpool combinations, matching one of the plurality of candidate carpool combinations with the vehicle for pooling the on-going transportation order and the one candidate carpool combination; and transmitting a dispatch signal to a computing device corresponding to the vehicle based on the match for the vehicle to pool passengers corresponding to the on-going transportation order and the one candidate carpool combination.

* * * * *